United States Patent
Harris et al.

(10) Patent No.: US 7,231,485 B2
(45) Date of Patent: Jun. 12, 2007

(54) UNIVERSAL SERIAL BUS (USB) INTERFACE FOR MASS STORAGE DEVICE

(75) Inventors: David H. Harris, Boise, ID (US); Gordon R. Clark, Meridian, ID (US); Stephen D. Holland, Boise, ID (US)

(73) Assignee: Cypress Semiconductor Corp., San Jose, CA (US)

( * ) Notice: Subject to any disclaimer, the term of this patent is extended or adjusted under 35 U.S.C. 154(b) by 732 days.

(21) Appl. No.: 09/990,739

(22) Filed: Nov. 16, 2001

(65) Prior Publication Data

US 2002/0081873 A1 Jun. 27, 2002

Related U.S. Application Data

(60) Provisional application No. 60/249,530, filed on Nov. 17, 2000.

(51) Int. Cl.
*G06F 13/36* (2006.01)
(52) U.S. Cl. .................. 710/315; 710/311; 710/74
(58) Field of Classification Search ............ 710/36, 710/74, 305, 306, 311, 313, 315
See application file for complete search history.

(56) References Cited

U.S. PATENT DOCUMENTS

| | | | |
|---|---|---|---|
| 6,199,122 B1 | 3/2001 | Kobayashi | |
| 6,233,640 B1 * | 5/2001 | Luke et al. | 710/315 |
| 6,292,863 B1 * | 9/2001 | Terasaki et al. | 710/313 |
| 6,618,788 B1 * | 9/2003 | Jacobs | 710/315 |
| 6,633,933 B1 * | 10/2003 | Smith et al. | 710/74 |

FOREIGN PATENT DOCUMENTS

| | | |
|---|---|---|
| EP | 0890905 A2 | 1/1999 |
| EP | 0987876 A2 | 3/2000 |
| EP | 1111498 A2 | 6/2001 |

OTHER PUBLICATIONS

Definition of ATA (Advanced Technology Attachment from Wikipedia.*
Universal Serial Bus Specification, Revision 2.0, pp. 28-38, Apr. 27, 2000.*
Designing a Robust USB Serial Interface Engine (SIE), http://www.usb.org/developers/whitepapers/siewp.pdf.*
USB in a Nutshell, http://www.beyondlogic.org/usbnutshell/usb-in-a-nutshell.pdf.*
Definition of "state machine" from Whatis.com.*
NEC, NEC USB2.0-ATA/ATAPI Bridge, NEC Press Release Oct. 5, 2000, 2 pages.
NEC, USB2.0-Compliant IDE Bridge, Nov. 7, 2002, 1 page.

* cited by examiner

*Primary Examiner*—Khanh Dang
(74) *Attorney, Agent, or Firm*—Marger Johnson & McCollom P.C.

(57) ABSTRACT

A mass storage device motherboard or secondary board includes a bridging circuit. The bridging circuit converts signals from the mass storage device into USB signals. The bridging circuit can be provided by a chip that converts ATA/ATAPI signals into USB signals.

18 Claims, 2 Drawing Sheets

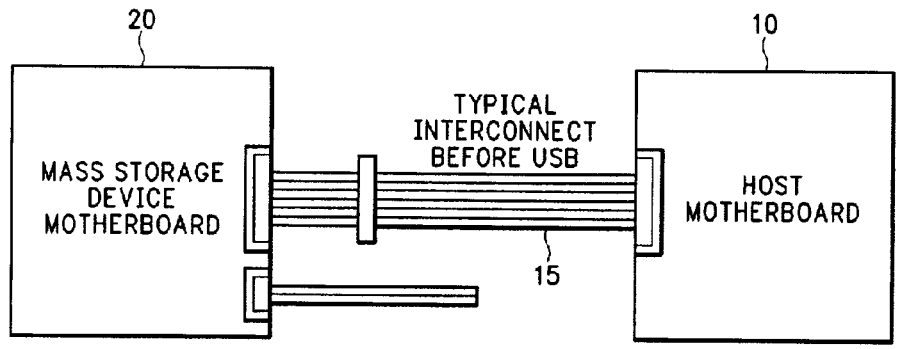
FIG.1
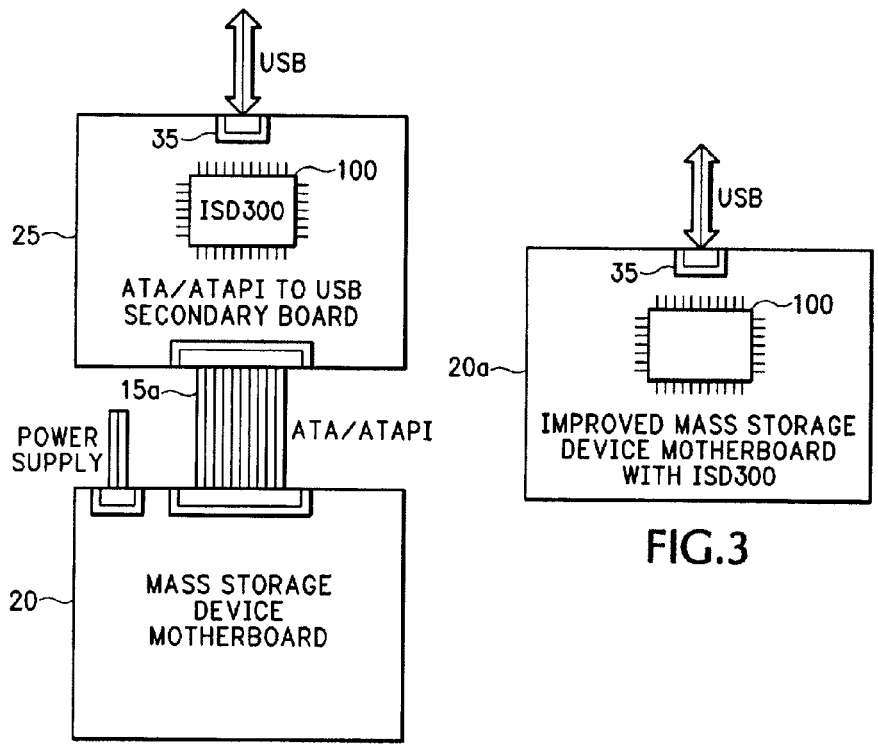
FIG.2
FIG.3

US 7,231,485 B2

UNIVERSAL SERIAL BUS (USB) INTERFACE FOR MASS STORAGE DEVICE

This application claims priority from U.S. Provisional Application Ser. No. 60/249,530 filed Nov. 17, 2000, the contents of which are incorporated herein by reference in their entirety.

BACKGROUND OF THE INVENTION

This invention relates generally to technologies for driving mass storage devices. More specifically, this invention relates to devices and methods for communicating between a host motherboard and one or more mass storage devices.

FIG. 1 illustrates a conventional communications interface between a host motherboard 10 and a mass storage device motherboard 20. Referring to FIG. 1, traditional communication between a motherboard 20 of a mass storage device and a host motherboard 10 occurs via a drive interconnection ribbon cable 15. Using this communications method, the high speed Integrated (or Intelligent) Drive Electronics (IDE) data and control signals must generally be driven through connectors and potentially lengthy cabling to off-board electronics.

More recently, FireWire-based mass storage devices have become available in configurations that have either an adaptor board or main board integration to accomplish a bridging function. These devices are classified as bridging devices because there are still intermediate protocols (i.e., such as ATA/ATAPI or SCSI) between the mass storage head and the I/O connectivity leaving the mass storage device motherboard.

SUMMARY OF THE INVENTION

A bridging technology according to various aspects and embodiments of the present invention enables mass storage applications to benefit from the speed and versatility of the Universal Serial Bus (USB) protocol, and particularly USB 2.0.

According to one aspect of the present invention, a bridging circuit is configured to provide communication between a mass storage device motherboard and a USB port on a host motherboard.

According to another aspect of the present invention, a mass storage device motherboard has a bridging circuit embedded therein According to yet another aspect of the present invention, a chip is provided to convert ATA/ATAPI signals into USB signals.

A mass storage device motherboard, according to a preferred embodiment of the invention, comprises an onboard bridging circuit to translate ATA/ATAPI signals into USB 2.0 signals. Most preferably, the bridging circuit comprises a single bridging chip. Providing translation capabilities in a single chip simplifies the task of integrating the drive and input/output (I/O) electronics to support USB connectivity directly onto the mass storage device motherboard itself. The mass storage device motherboard could be used for any mass storage device, such as hard drives, magneto optical drives, CD drives, CD-RW drives, DVD-RAM drives, DVD+RW drives, and others.

Alternatively, a secondary board could be used to provide the translation function. In this embodiment, the secondary board includes the bridging circuit for converting ATA/ATAPI signals to USB signals. The secondary board receives the ATA/ATAPI signals from a mass storage device motherboard and outputs USB signals to the host motherboard.

According to another aspect of this invention, a bridging chip, used to provide ATA/ATAPI to USB 2.0 conversion, receives ATA/ATAPI signal input into a disk interface through an ATA/ATAPI interface port and outputs USB signals to a USB interface through a USB transceiver.

BRIEF DESCRIPTION OF THE DRAWINGS

The foregoing objects, features, and advantages of the present invention will become more readily apparent from the following detailed description of preferred embodiments, made with reference to the following figures, in which:

FIG. 1 is a schematic diagram illustrating a conventional communications interface between a mass storage device motherboard and a host motherboard.

FIG. 2 is a schematic diagram illustrating a secondary board (or bridging device) for converting ATA/ATAPI signals from a mass storage device into USB signals, according to one embodiment of this invention.

FIG. 3 is a schematic diagram illustrating an integrated mass storage device motherboard having onboard USB communications according to another aspect of this invention.

DETAILED DESCRIPTION OF PREFERRED EMBODIMENTS

Figure 4:
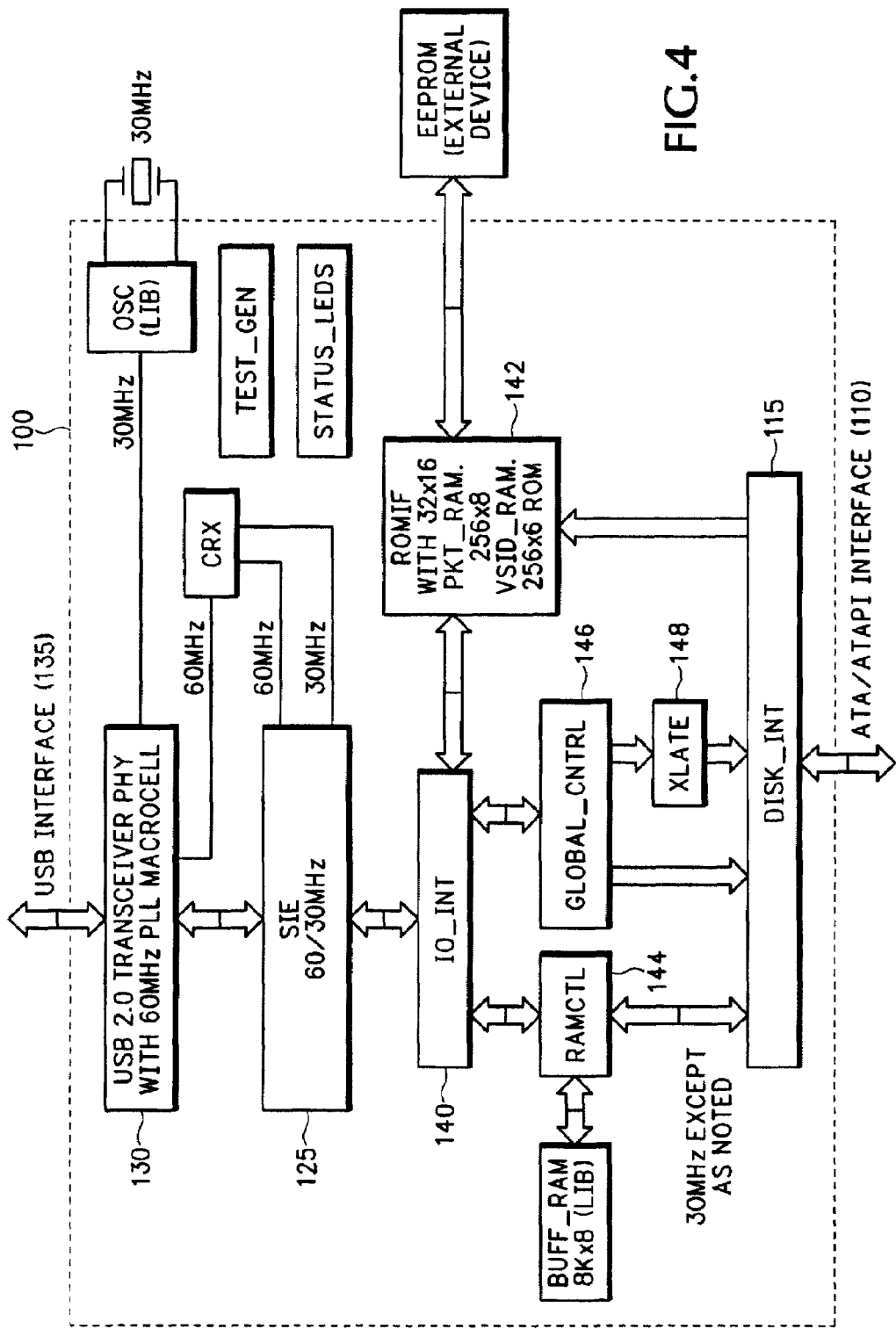
FIG. 4 is a schematic diagram illustrating the construction and layout of a bridging chip used to provide ATA/ATAPI to USB conversion in the secondary board of FIG. 2 and the integrated mass storage device motherboard of FIG. 3.

Referring to FIG. 2, according to one embodiment of this invention, a secondary board (or bridging device) 25 includes a bridging circuit to convert ATA/ATAPI signals from a mass storage device motherboard 20 into USB signals. The secondary board 25 preferably utilizes a bridging chip 100 to provide the bridging circuit.

Referring to FIG. 3, according to another embodiment of this invention, an improved mass storage device motherboard 20a has an onboard bridging circuit that provides ATA/ATAPI to USB translation. As in the earlier embodiment, the bridging circuit is preferably implemented using a bridging chip 100. The bridging chip 100 readily permits the integration of all of the drive and I/O electronics to support USB connectivity onto the device motherboard 20a.

The secondary board 25 and improved mass storage device motherboard 20a, according to these preferred embodiments of the invention, can be used to facilitate more efficient communication between a host motherboard and a hard drive, magneto optical drive, CD drive, CD-RW drive, DVD-RAM drive, DVD+RW drive, or any other mass storage device or combination of mass storage devices. These and other aspects and embodiments of the invention will be described in further detail below.

In the embodiment shown in FIG. 2, a bridging chip 100 is located on a bridging device comprising an intermediate or secondary circuit board 25. The bridging chip 100 translates ATA/ATAPI signals into USB 2.0 signals. Use of a separate, secondary board 25 to provide the bridging function, rather than an integrated motherboard, may be desirable, for instance, where integration onto the motherboard 20 of the mass storage device itself is impractical. A secondary board may also be desirable when retrofitting the communications interface of an existing mass storage device.

According to this embodiment, an intermediate forty pin (or forty-four pin for a 2.5 inch drive) conductor ribbon cable 15a having two headers and two mating ribbon cable connectors is arranged between the mass storage device motherboard (or primary circuit board) 20 and the secondary (or bridging) circuit board 25. The secondary board 25 receives ATA/ATAPI signals from the mass storage device through the intermediate conductor ribbon cable 15a. The secondary board 25 includes the bridging chip 100 for converting the ATA/ATAPI signals into USB 2.0 signals. The USB 2.0 signals are then supplied to the host motherboard (not shown) through a USB connector 35.

Referring to FIG. 3, according to another aspect of this invention, the USB interface is integrated directly onto the mass storage device motherboard 20a using the bridging chip 100. Provision of the ATA/ATAPI to USB 2.0 conversion function in a single chip 100 simplifies this integration. Onboard conversion to the USB protocol allows optimization of the drive characteristics with respect to the signals that were conventionally required to go to the drive interconnect ribbon cable 15 (see FIG. 1). Onboard bridging circuit integration thereby lowers the power requirements of the mass storage device by eliminating the need to drive the high speed IDE data and control signals through connectors and potentially lengthy cabling to off-board electronics.

Referring to FIGS. 2 and 3, the integration of the bridging circuit directly onto the mass storage device motherboard 20a also provides improvements over the bridging device 25 of FIG. 2. Among other things, permitting the ATA/ATAPI signals to remain on the primary circuit board 20a eliminates the need for an intermediate conductor ribbon cable 15a and its headers, and further eliminates the need for mating ribbon cable connectors on the primary and secondary circuit boards 20, 25.

Another benefit of this integrated configuration over the earlier-described embodiment is the elimination of duplicate resources that are otherwise required on each separate circuit board 20, 25. These resources include, but are not limited to, reset logic, power supply switching, regulation and conditioning, clock generation circuitry, and crystal(s) for clock generation. Duplicate power supply cabling and their associated connectors can also be eliminated, provided that the mass storage device can be powered from the USB bus directly or by current augmentation, such as that described in U.S. Pat. No. 6,252,375, the contents of which are incorporated herein by reference in their entirety.

Additional advantages of this embodiment include the elimination of the secondary circuit board 25 and the associated hardware used to mount and secure the secondary board 25 and to support its connectors and cables. The components needed to reduce EMI emissions from the connecting or power supply cables are also eliminated. The noise susceptibility of the mass storage device is also reduced because of the elimination of its cables and connectors. These benefits, individually and collectively, further result in lower production costs, a reduced overall parts count, and increased reliability of the mass storage device.

The USB technology itself also offers several advantages over other communications technologies. One advantage is that the current through the USB wiring is relatively low compared to that of other technologies. USB also enables plug-and-play capabilities, where other technologies require manual adjustment of dip-switch settings and the like. Furthermore, USB-connected devices can be powered from the USB bus or through current augmentation, whereas devices using other technologies are typically powered through their own, independent power supplies.

Referring to FIG. 4, a single-chip, application-specific integrated circuit (ASIC) 100 preferably performs the ATA/ATAPI to USB 2.0 translation function in the secondary board 25 of FIG. 2 as well as in the integrated mass storage device motherboard 20a of FIG. 3. This chip 100, called the ISD300, has an integrated USB 2.0 physical interface transceiver (PHY) 130, Serial Interface Engine (SIE) 125, Data Buffering, and Disk Interface (DISK_INT) 115. The bridging chip 100 receives data into an input 110 thereof, performs the conversion function, and outputs a USB signal from an output 135 thereof.

In addition, the bridging chip 100 includes an input/output interface (IO_INT) 140 coupled to the SIE 125. The input/output interface 140 is coupled to a memory 142, a RAM control circuit (RAMCTL) 144 and a global control circuit 146. The global control circuit 146 is coupled to a translate circuit (XLATE) 148. The disk interface 115 is coupled to the RAM control circuit 144, the global control circuit 146, and the translate circuit 148.

More specifically, an ATA/ATAPI Interface serves as an input 110 to receive ATA/ATAPI signals from a read unit of the mass storage device (not shown). The Disk Interface (DISK_INT) 115 receives the ATA/ATAPI signals from the ATA/ATAPI Interface 110 and transmits them the other components. The remaining chip components, such as the input/output interface 140, the RAM control circuit 144, the global control circuit 146, and the translate circuit (XLATE) 148 provide conversion logic and are used to buffer and convert the ATA/ATAPI signals into USB 2.0 signals. The resulting USB signals are output to a USB Interface 135 through the USB 2.0 physical interface transceiver (PHY) 130.

The ISD300 can perform the translation function without requiring any firmware within the chip. The translation is accomplished using a state-machine that can perform the translation function without any code running inside of it. The ISD300 can be configured to receive direction from the hard drive, such as embedded control information, that tells the chip what to do with the information once it has passed through the translation bridge.

Having described and illustrated the principles of the invention with respect to various preferred embodiments thereof, it should be apparent that the invention can be modified in arrangement and detail without departing from such principles. We therefore claim all modifications and variations coming within the spirit and scope of the following claims.

What is claimed is:

1. A method of communicating with a mass storage device comprising:

receiving ATA/ATAPI signals from a mass storage device into a bridging circuit; updating a state machine in response to embedded commands in the ATA/ATAPI signals; converting the ATA/ATAPI signals from the mass storage device into USB signals using the bridging circuit in response to the state machine; and outputting the USB signals from the bridging circuit;

wherein the bridging circuit is provided in a single, bridging chip, the bridging chip including:

a USB physical interface transceiver;

a serial interface engine coupled to the USB physical interface transceiver;

an input/output interface coupled to the serial interface engine;

a ram control circuit coupled to the input/output interface;

a global control circuit coupled to the input/output interface;

a translate circuit coupled to the global control circuit; and a disk interface coupled to the ram control circuit and the translate circuit.

2. A method according to claim 1 wherein the bridging circuit is provided on a motherboard of the mass storage device.

3. A method according to claim 1 wherein the bridging circuit is provided on a secondary board.

4. A method according to claim 3 wherein a mass storage device motherboard outputs the ATA/ATAPI signals, and wherein the secondary board receives the ATA/ATAPI signals from the mass storage device motherboard and converts them into USB signals.

5. A motherboard for a mass storage device, said motherboard comprising:
input logic configured to receive an input signal from a read unit of the mass storage device;
a bridging circuit configured to receive the input signal from the input logic and convert the input signal into a USB signal, the bridging circuit including:
a USB physical interface transceiver;
a serial interface engine coupled to the USB physical interface transceiver;
an input/output interface coupled to the serial interface engine;
a ram control circuit coupled to the input/output interface;
a global control circuit coupled to the input/output interface;
a translate circuit coupled to the global control circuit; and
a disk interface coupled to the ram control circuit and the translate circuit; and
output circuitry configured to output the USB signal from the motherboard.

6. A mass storage device motherboard according to claim 5 wherein the bridging circuit comprises a bridging chip for converting the input signal into the USB signal.

7. A mass storage device motherboard according to claim 6 wherein the bridging chip comprises:
an ATA/ATAPI interface configured to receive an ATA/ATAPI signal from the input logic; and
a state machine configured to translate the ATA/ATAPI signals into the USB signal; wherein:
the disk interface is configured to receive the ATA/ATAPI signals from the ATA/ATAPI interface;
the USB physical interface transceiver is configured to receive signals from the serial interface engine and output USB signals to a USB interface; and
the state machine is updated in response to embedded commands in the ATA/ATAPI signals.

8. A secondary board configured to enable communication between a mass storage device motherboard and a host motherboard, said secondary board comprising:
a connector port for receiving signals from the mass storage device motherboard;
a bridging circuit for convening the signals from the mass storage device motherboard into USB signals, the bridging circuit including:
a USB physical interface transceiver;
a serial interface engine coupled to the USB physical interface transceiver;
an input/output interface coupled to the serial interface engine;
a ram control circuit coupled to the input/output interface;
a global control circuit coupled to the input/output interface;
a translate circuit coupled to the global control circuit; and
a disk interface coupled to the ram control circuit and the translate circuit; and
a USB connector port for outputting the USB signals to the host motherboard.

9. A secondary board according to claim 8 wherein the bridging circuit comprises a bridging chip configured to translate the signals from the mass storage device motherboard into the USB signals.

10. A secondary board according to claim 9 wherein:
the bridging circuit includes a state machine responsive to embedded commands in the ATA/ATAPI signals configured to translate the signals from the mass storage device motherboard into the USB signals; and
the disk interface receives ATA/ATAPI signals through an ATA/ATAPI interface, and the bridging circuit is configured to translate the ATA/ATAPI signals into USB 2.0 signals in response to the state machine and output the USB 2.0 signals to a USB Interface through the USB physical interface transceiver.

11. A bridging chip comprising:
an input configured to receive ATA/ATAPI signals; a USB physical interface transceiver;
conversion logic configured to convert the ATA/ATAPI signals into USB signals, the conversion logic including:
a serial interface engine coupled to the USB physical interface transceiver;
an input/output interface coupled to the serial interface engine;
a ram control circuit coupled to the input/output interface;
a global control circuit coupled to the input/output interface;
a translate circuit coupled to the global control circuit; and
a disk interface coupled to the input, the ram control circuit, and the translate circuit; and
an output coupled to the USB physical interface transceiver and configured to output the USB signals.

12. A chip according to claim 11 wherein the conversion logic includes a state machine responsive to embedded commands in the ATA/ATAPI signals.

13. A chip according to claim 11 wherein the chip is located on a mass storage device motherboard.

14. A chip according to claim 11 wherein the chip is located on a secondary board.

15. A chip according to claim 14 wherein the secondary board is arranged to receive ATA/ATAPI signals from a motherboard of the mass storage device.

16. A method of converting signals from a mass storage device into USB signals, said method comprising:
receiving a signal from a mass storage device into a bridging chip, the bridging chip including:
a USB physical interface transceiver;
a serial interface engine coupled to the USB physical interface transceiver;
an input/output interface coupled to the serial interface engine;
a ram control circuit coupled to the input/output interface;
a global control circuit coupled to the input/output interface;
a translate circuit coupled to the global control circuit; and
a disk interface coupled to the ram control circuit and the translate circuit;
updating a state machine in the bridging chip in response to embedded commands in the signal from the mass storage device;

converting the signal from the mass storage device into a USB signal in response to the state machine; and outputting the USB signal from the bridging chip.

17. A method of convening signals according to claim 16 wherein said bridging chip is located on a motherboard of the mass storage device.

18. A method of converting signals according to claim 16 wherein the bridging chip is located on a secondary board arranged in communication with a motherboard of the mass storage device.

* * * * *

UNITED STATES PATENT AND TRADEMARK OFFICE
CERTIFICATE OF CORRECTION

| | | |
|---|---|---|
| PATENT NO. | : 7,231,485 B2 | Page 1 of 1 |
| APPLICATION NO. | : 09/990739 | |
| DATED | : June 12, 2007 | |
| INVENTOR(S) | : David H. Harris, Gordon R. Clark and Stephen D. Holland | |

It is certified that error appears in the above-identified patent and that said Letters Patent is hereby corrected as shown below:

At column 5, line 52, please replace "convening" with
--converting--

At column 7, line 4, please replace "convening" with
--converting--

Signed and Sealed this

Fourth Day of December, 2007

JON W. DUDAS
*Director of the United States Patent and Trademark Office*